US008658952B2

(12) United States Patent
Lafferty

(10) Patent No.: US 8,658,952 B2
(45) Date of Patent: Feb. 25, 2014

(54) VENTED SUSCEPTOR STRUCTURE

(75) Inventor: Terrence P. Lafferty, Neenah, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 396 days.

(21) Appl. No.: 12/766,983

(22) Filed: Apr. 26, 2010

(65) Prior Publication Data

US 2010/0270294 A1    Oct. 28, 2010

Related U.S. Application Data

(60) Provisional application No. 61/214,758, filed on Apr. 28, 2009.

(51) Int. Cl.
*H05B 6/80* (2006.01)
*H05B 6/64* (2006.01)

(52) U.S. Cl.
USPC .......... 219/730; 219/727; 219/728; 219/729; 219/759; 426/107; 426/113; 426/234

(58) Field of Classification Search
USPC .......... 217/727, 728, 729, 730, 759; 426/107, 426/113, 234
See application file for complete search history.

(56) References Cited

U.S. PATENT DOCUMENTS

| | | | |
|---|---|---|---|
| 4,268,738 A | 5/1981 | Flautt, Jr. et al. | |
| 4,283,427 A * | 8/1981 | Winters et al. | 426/107 |
| 4,775,771 A | 10/1988 | Pawlowski | |
| 4,865,921 A | 9/1989 | Hollenberg | |
| 4,890,439 A | 1/1990 | Smart | |
| 4,936,935 A | 6/1990 | Beckett | |
| 4,943,456 A | 7/1990 | Pollart et al. | |
| 4,963,424 A | 10/1990 | Beckett | |
| 5,002,826 A | 3/1991 | Pollart et al. | |
| 5,039,364 A | 8/1991 | Beckett et al. | |
| 5,117,078 A | 5/1992 | Beckett | |
| 5,118,747 A | 6/1992 | Pollart et al. | |
| 5,170,025 A | 12/1992 | Perry | |
| 5,213,902 A | 5/1993 | Beckett | |
| 5,221,419 A | 6/1993 | Beckett | |
| 5,260,537 A | 11/1993 | Beckett | |

(Continued)

FOREIGN PATENT DOCUMENTS

| | | |
|---|---|---|
| JP | 63-66703 | 5/1988 |
| JP | S63-86075 | 6/1988 |

(Continued)

OTHER PUBLICATIONS

International Search Report and Written Opinion dated Nov. 26, 2010 from PCT/US2010/032336.

(Continued)

*Primary Examiner* — Dao H Nguyen
(74) *Attorney, Agent, or Firm* — Womble Carlyle Sandridge & Rice, LLP

(57) ABSTRACT

A microwave heating construct comprises a first panel and a second panel, each comprising a microwave energy interactive material. The panels are partially joined to one another in an opposed, facing relationship such that an unjoined area is defined between the first panel and the second panel. The unjoined area is in communication with an open peripheral edge of the construct. The first panel includes an aperture in communication with the unjoined area between the first panel and the second panel.

11 Claims, 6 Drawing Sheets

(56) References Cited

U.S. PATENT DOCUMENTS

| | | |
|---|---|---|
| 5,266,386 A | 11/1993 | Beckett |
| RE34,683 E | 8/1994 | Maynard |
| 5,340,436 A | 8/1994 | Beckett |
| 5,354,973 A | 10/1994 | Beckett |
| 5,410,135 A | 4/1995 | Pollart et al. |
| 5,412,187 A | 5/1995 | Walters et al. |
| 5,424,517 A | 6/1995 | Habeger |
| 5,434,393 A | 7/1995 | Jurkofsky |
| 5,519,195 A | 5/1996 | Keefer |
| 5,530,231 A | 6/1996 | Walters et al. |
| 5,628,921 A | 5/1997 | Beckett |
| 5,672,407 A | 9/1997 | Beckett |
| 5,759,422 A | 6/1998 | Schmelzer |
| 5,800,724 A | 9/1998 | Habeger |
| 6,114,679 A | 9/2000 | Lai |
| 6,150,646 A | 11/2000 | Lai et al. |
| 6,204,492 B1 | 3/2001 | Zeng et al. |
| 6,251,451 B1 | 6/2001 | Zeng |
| 6,414,290 B1 | 7/2002 | Cole |
| 6,433,322 B2 | 8/2002 | Zeng et al. |
| 6,455,827 B2 | 9/2002 | Zeng |
| 6,552,315 B2 | 4/2003 | Zeng et al. |
| 6,677,563 B2 | 1/2004 | Lai |
| 6,717,121 B2 | 4/2004 | Zeng |
| 6,765,182 B2 | 7/2004 | Cole |
| 7,019,271 B2 | 3/2006 | Wnek et al. |
| 7,351,942 B2 | 4/2008 | Wnek et al. |
| 2001/0032843 A1 | 10/2001 | Aronsson et al. |
| 2003/0000948 A1 | 1/2003 | Cole et al. |
| 2004/0062839 A1* | 4/2004 | Pedersen .................. 426/110 |
| 2004/0234653 A1 | 11/2004 | Cogley et al. |
| 2006/0049190 A1 | 3/2006 | Middleton |
| 2006/0289519 A1 | 12/2006 | Sharp |
| 2007/0221666 A1 | 9/2007 | Keefe |
| 2007/0251943 A1 | 11/2007 | Wnek et al. |
| 2007/0275136 A1 | 11/2007 | Hopkins, Sr. |
| 2008/0035634 A1 | 2/2008 | Zeng et al. |
| 2008/0078759 A1 | 4/2008 | Wnek et al. |
| 2008/0245787 A1 | 10/2008 | Lambert et al. |
| 2009/0302032 A1 | 12/2009 | Middleton |
| 2010/0012651 A1* | 1/2010 | Dorsey .......................... 219/730 |
| 2010/0059511 A1* | 3/2010 | Gowens et al. ............... 219/730 |
| 2010/0193509 A1* | 8/2010 | Fitzwater ...................... 219/730 |

FOREIGN PATENT DOCUMENTS

| | | |
|---|---|---|
| JP | 2-128838 | 5/1990 |
| JP | 4-83132 | 7/1992 |
| JP | 5-24581 | 3/1993 |
| JP | 2000-30854 | 1/2000 |
| JP | 2001-348075 | 12/2001 |
| WO | WO 2005/068322 A1 | 7/2005 |
| WO | WO 2007/127371 A2 | 11/2007 |
| WO | WO 2007/146650 A2 | 12/2007 |
| WO | WO 2009/152120 A2 | 12/2009 |
| WO | WO 2010/129205 A2 | 11/2010 |

OTHER PUBLICATIONS

Notification of Reason for Refusal for JP Application No. 2011-513622 dated Jul. 11, 2012 with English translation.
International Search Report—PCT/US2009/046683.
Written Opinion—PCT/US2009/046683.
International Preliminary Report on Patentability—PCT/US2009/046683, Dec. 13, 2010, Graphic Packaging International, Inc.
International Preliminary Report on Patentability—PCT/US2010/032336, Nov. 1, 2011, Graphic Packaging International, Inc.
Supplementary European Search Report for EP 10772476.7 dated Jun. 3, 2013.
Notification of Reason for Refusal for JP 2012-508558 dated Jun. 25, 2013 with English translation.
Decision of Rejection for JP 2012-508558 dated Nov. 14, 2013 with English translation.
US 6,177,664, 01/2001, Cole et al. (withdrawn)

* cited by examiner

VENTED SUSCEPTOR STRUCTURE

CROSS-REFERENCE TO RELATED APPLICATION

This application claims the benefit of U.S. Provisional Application No. 61/214,758, filed Apr. 28, 2009, which is incorporated by reference herein in its entirety.

TECHNICAL FIELD

This disclosure relates to various microwave energy interactive structures, packages, apparatuses, or constructs for heating, browning, and/or crisping a food item in a microwave oven.

BACKGROUND

Microwave ovens provide a convenient means for heating a variety of food items, including sandwiches and other bread and/or dough-based products such as pizzas and pies. However, microwave ovens tend to cook such items unevenly and are unable to achieve the desired balance of thorough heating and a browned, crisp crust. As such, there is a continuing need for improved materials, packages, and other constructs that provide the desired degree of heating, browning, and/or crisping of various food items in a microwave oven.

SUMMARY

This disclosure is directed generally to various constructs and methods for heating, browning, and/or crisping a food item in a microwave oven. In accordance with at least some embodiments of the disclosure, the various constructs generally include at least two sections or panels that are partially joined to one another to define a gap or unjoined area between the panels. At least one panel, for example, the panel intended for contact with the food item, includes one or more apertures that communicate with the unjoined area. The apertures cooperate with the unjoined area to assist with the transport or venting of moisture away from the food item to enhance the browning and/or crisping of the food item. Further, one or both panels include a susceptor or susceptor layer, i.e., a thin layer of microwave energy interactive material (generally less than about 100 angstroms in thickness, for example, from about 60 to about 100 angstroms in thickness, and having an optical density of from about 0.15 to about 0.35, for example, about 0.17 to about 0.28) that tends to absorb at least a portion of impinging microwave energy and convert it to thermal energy (i.e., heat). The thermal energy then can be transferred to the food item to heat, brown, and/or crisp the food item.

In some examples, the arrangement of susceptors and/or apertures may be used to simulate the appearance of food items prepared using other conventional heating apparatuses, for example, grills or skillets. In other examples, the arrangement of susceptors and/or apertures may be used to impart a logo, a graphic, product information, or any other indicia to the surface of the food item.

The apparatus or construct may be used to prepare various food items in a microwave oven, for example, sandwiches, savory or sweet pastries, breaded food items, or any other food item that desirably is heated, browned, and/or crisped. The construct may be formed at least partially from a disposable material, for example, paper or paperboard.

Additional aspects, features, and advantages of the present invention will become apparent from the following description and accompanying figures.

BRIEF DESCRIPTION OF THE DRAWINGS

The description refers to the accompanying drawings in which like reference numerals refer to like parts throughout the several views, and in which.

DESCRIPTION

The present invention may be illustrated further by referring to the figures. For purposes of simplicity, like numerals may be used to describe like features. It will be understood that where a plurality of similar features are depicted, not all of such features necessarily are labeled on each figure. It also will be understood that various components used to form the microwave energy interactive structures may be interchanged. Thus, while only certain combinations are illustrated herein, numerous other combinations and configurations are contemplated by this disclosure.

Figure 1A:
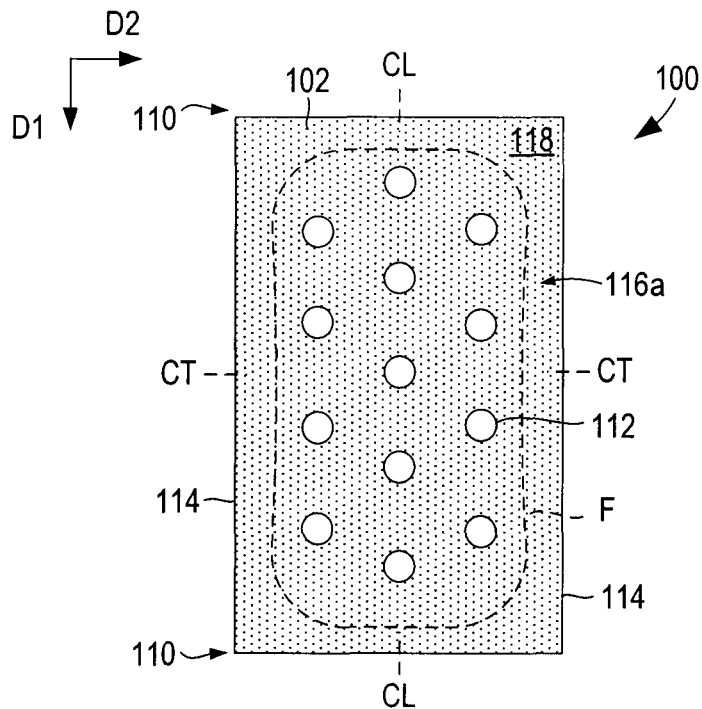
FIG. 1A is a schematic top plan view of an exemplary construct for heating, browning, and/or crisping a food item in a microwave oven.
Figure 1B:
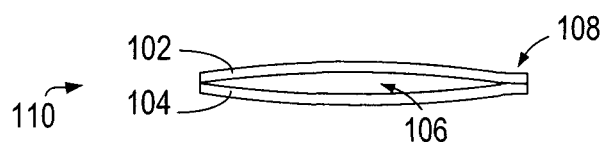
FIG. 1B is a schematic end elevation view of the construct of FIG. 1A.
Figure 1C:
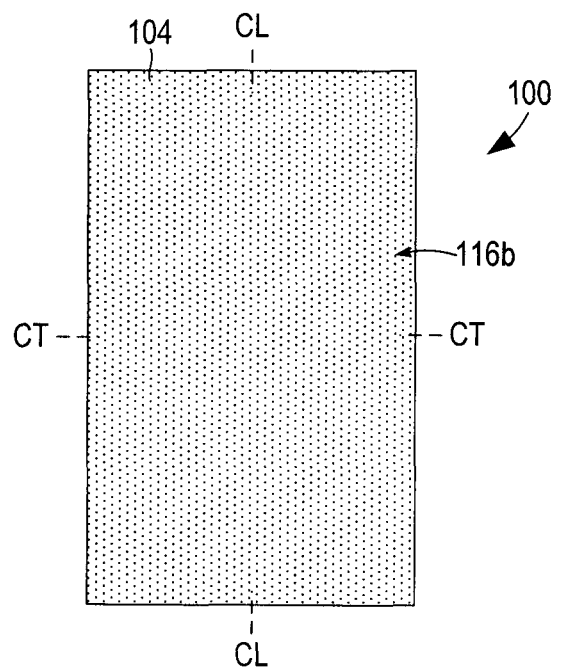
FIG. 1C is a schematic bottom plan view of the construct of FIG. 1A.

FIGS. 1A-1C schematically illustrate an exemplary microwave heating construct or apparatus 100 (e.g., a tray or card) for heating, browning, and/or crisping a food item F (shown schematically with dashed lines) in a microwave oven. FIG. 1A schematically illustrates a top plan view of a first side (e.g., top) of the construct 100, FIG. 1B schematically illustrates an end elevation view of the construct 100 of FIG. 1A, and FIG. 1C schematically illustrates a top plan view of a second side (e.g., bottom) of the construct 100.

The construct 100 has a generally rectangular shape suitable for receiving a somewhat elongate food item or a plurality of smaller food items thereon, for example, a French bread pizza, a filled pastry product, a breaded meat product, a calzone, a Stromboli, or any other suitable food item. However, the construct 100 may have any suitable shape needed or desired to prepare a particular food item (or items).

The construct 100 and its various features or components generally have a first dimension, for example, a length, extending in a first direction, for example, a longitudinal direction, D1, and a second dimension, for example, a width, extending in a second direction, for example, a transverse direction, D2. It will be understood that such designations are made only for convenience and do not necessarily refer to or limit the manner in which the construct is manufactured. In some embodiments, the construct 100 may be symmetric or nearly symmetric about a transverse centerline CT and/or along a longitudinal centerline CL.

The construct 100 includes a first panel 102 and a second panel 104 partially joined to one another to create a multilayer structure that includes an unjoined area or gap 106 between the panels 102, 104, as shown in FIG. 1B. It will be understood that the size of the gap is exaggerated for illustrative purposes in FIG. 1B and that the actual space or distance between the two panels 102, 104 may be very small, such that the panels 102, 104 may be at least partially contacting one another.

The first panel 102 and the second panel 104 may be joined to one another adhesively or otherwise along an attachment area 108 (FIG. 1B), for example, along a portion of the peripheral margin of the construct 100, or in any other suitable area of the construct 100. In this example, the construct 100 includes a single, substantially continuous attachment area 108, although other embodiments may include two or more attachment areas. At least a portion of the peripheral margin may remain unattached, for example, at least a portion of one or both ends 110 of the construct 100, as shown in FIG. 1B.

One or both panels 102, 104 may include one or more venting apertures 112 that extend through the thickness of the respective panel 102, 104 to assist with the transport of moisture and other vapors away from the food item F and to further enhance browning and/or crisping. In this example, panel 102 includes a plurality of substantially circular apertures 112 arranged in rows extending substantially in the first direction D1. A first row of apertures 112 lies substantially along the longitudinal centerline CL, while second and third rows of apertures 112 lie between the first row and respective longitudinal edges 114 of the construct 100. In this example, the first row includes five apertures and the second and third rows each include four apertures. However, other shapes, numbers, and configurations of apertures may be used.

Each panel 102, 104 includes a microwave energy interactive element 116a, 116b, for example, a susceptor or susceptor layer (shown schematically with stippling in FIGS. 1A and 1C). Each susceptor layer 116a, 116b is operative for converting at least a portion of impinging microwave energy into thermal energy, which then can be transferred to the surface of the food item F. In this example, each susceptor layer 116a, 116b extends substantially to the various peripheral edges of the construct. However, it is contemplated that the susceptor layer 116a, 116b may be used in only a portion of the construct 100.

As will be apparent from the figures, in all areas of the construct 100 except where an aperture 112 is present, there are two susceptor layers 116a, 116b in a superposed arrangement with one another. Further, except where the panels 102, 104 are adjoined to one another along the attachment area 108, there is an unjoined area that defines a void, space, or gap 106 between the panels 102, 104. The present inventor has discovered that a construct including two superposed susceptor layers 116a, 116b supported on partially unjoined panels 102, 104 results in superior heating, browning, and/or crisping when compared with a construct including two superposed susceptors on panels that are substantially joined to one another. While not wishing to be bound by theory, it is believed that the apertures 112 work in concert with the unjoined area or space 106 between the panels 102, 104 to provide a conduit for transporting moisture away from the food item, thereby allowing the food item to be browned and/or crisped more effectively.

To use the construct 100 according to one exemplary method, the food item F may be placed on a food-contacting surface 118 of the construct 100, in this example, such that the food item F is seated on at least a portion of the first panel 102. Upon sufficient exposure to microwave energy, the susceptors 116a, 116b convert at least a portion of the impinging microwave energy into thermal energy, which then may brown and/or crisp the surface of the food item. Browning and/or crisping may be facilitated further by the apertures 110, void 106, and unjoined peripheral margin of panels 102, 104 along the end(s) 110 of the construct 100, which collectively allow any excess moisture to be carried away from the food item F.

It will be recognized that during use, the weight of the food item may urge a portion of the first panel 102 towards the second panel 104, such that a portion of the first panel 102 is brought into contact with the second panel 104. In such areas, there may be little or no gap 106 between the panels 102, 104. However, the present inventor has recognized that paper-based materials (e.g., paper and paperboard) have a tendency to curl in the presence of moisture, and while not wishing to be bound by theory, it is believed that as the food item heats and the moisture level of the panels 102, 104 changes, the panels 102, 104 may tend to curl slightly towards or away from each other. As a result, in the areas where the first panel 102 is not pressing against the second panel 104, some space, even if small, may remain between the panels 102, 104. Such areas are believed to provide a sufficient pathway for the movement of moisture away from the food item.

Further, even where the space between panels 102, 104 is eliminated, moisture from the food item may still be carried away from the food item to assist with browning and/or crisping. Some of such moisture may be adsorbed onto the interior sides of panels 102, 104, and/or may be absorbed into the material (e.g., fibers) forming the panels 102, 104. Other possibilities are contemplated.

Figure 1D:
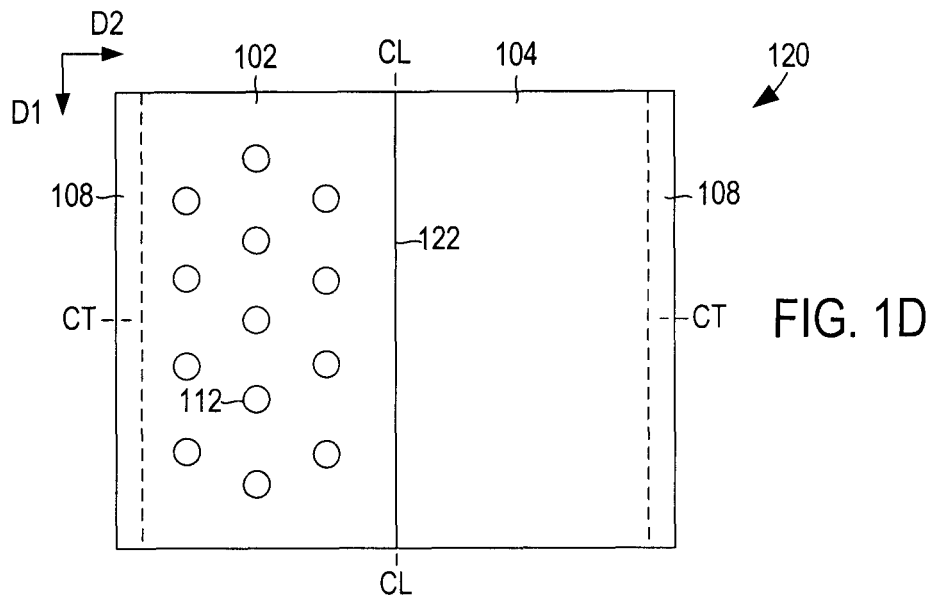
FIGS. 1D and 1E are schematic top and bottom plan views of an exemplary blank for forming the construct of FIGS. 1A-1C.
Figure 1E:
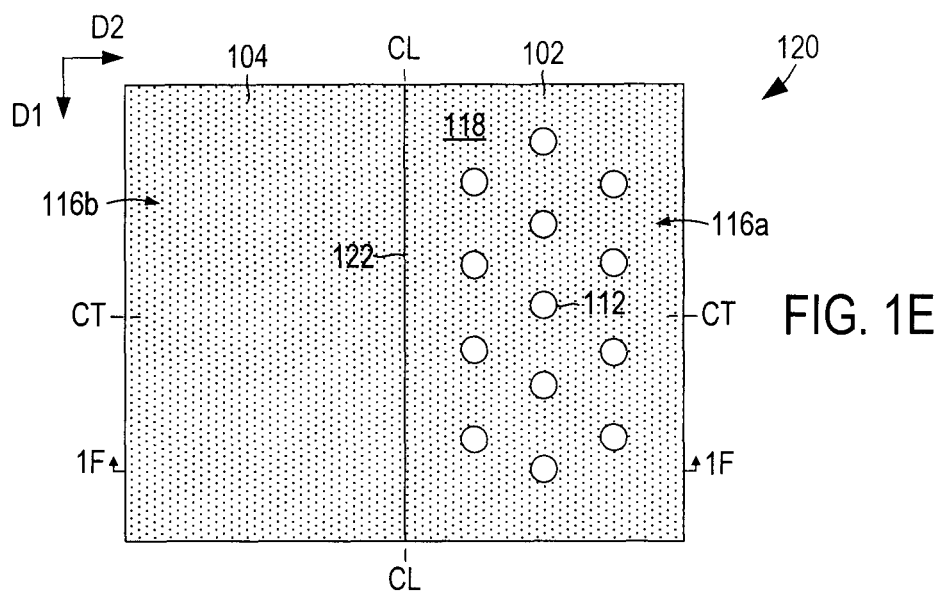

FIGS. 1D and 1E schematically depict opposite sides a blank 120 for forming the construct of FIGS. 1A-1C. FIG. 1D schematically illustrates a side (e.g., a first side) of the blank 120 that forms an interior of the construct 100, while FIG. 1E schematically illustrates a side (e.g., a second side) of the blank 120 that forms exterior side of the construct 100.

The blank 120 and its various features generally have a first dimension, for example, a length, extending in a first direction, for example, a longitudinal direction, D1, and a second dimension, for example, a width, extending in a second direction, for example, a transverse direction, D2. It will be understood that such designations are made only for convenience and do not necessarily refer to or limit the manner in which the blank is manufactured or erected into a construct. In some embodiments, the blank 120 may include some features that are symmetric or nearly symmetric about a transverse centerline CT and/or along a longitudinal centerline CL.

The blank 120 includes a pair of panels 102, 104 foldably joined to one another along a longitudinal line of disruption 122, for example, a fold line, score line, or the like, extending substantially along the longitudinal centerline CL of the blank 120. Alternatively, the longitudinal line of disruption 122 may be spaced slightly from the longitudinal centerline CL in a manner that assists with the formation of a gap or void 106 between the panels 102, 104. In other embodiments, the blank may include additional panels for forming a construct with side walls that define a gap between the panels. Such side walls may be gusseted if desired.

As shown in FIG. 1D, the opposite marginal areas of panels 102, 104 (shown with dashed lines) serve as attachment or glue areas 108 for joining the panels 102, 104 to one another. However, the attachment area(s) may have any other suitable location. A plurality of apertures 112 extend through the thickness of panel 102.

Figure 1F:
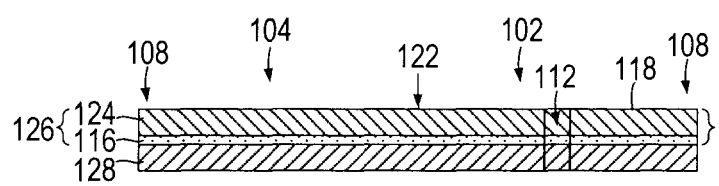
FIG. 1F is a schematic cross-sectional view of the blank of FIG. 1E taken along a line 1F-1F.

As shown in schematic cross-sectional view in FIG. 1F, each panel 102, 104 generally may comprise a plurality of adjoined layers. Each panel 102, 104 may comprise substantially the same arrangement of layers, for example, where the panels 102, 104 are formed from a single sheet of material, or may comprise different arrangements of layers, for example, where the construct 100 is formed from separate panels 102, 104. The number, type, and arrangement of layers in each panel may vary depending on the heating, browning, and/or crisping needs for a particular application. Thus, numerous possibilities are contemplated.

In the illustrated embodiment, each panel 102, 104 includes a layer of microwave energy interactive material 116 operative as a susceptor (i.e., susceptors or susceptor layers 116a, 116b) supported on a substantially microwave energy transparent material 124, for example, a polymer film, to form a susceptor film 126. The layer of microwave energy interactive material 116 may be joined to a support layer 128 (e.g., paper or paperboard) using an adhesive or other suitable material (not shown). Apertures 112 extend through the thickness of panel 102.

Figure 1G:
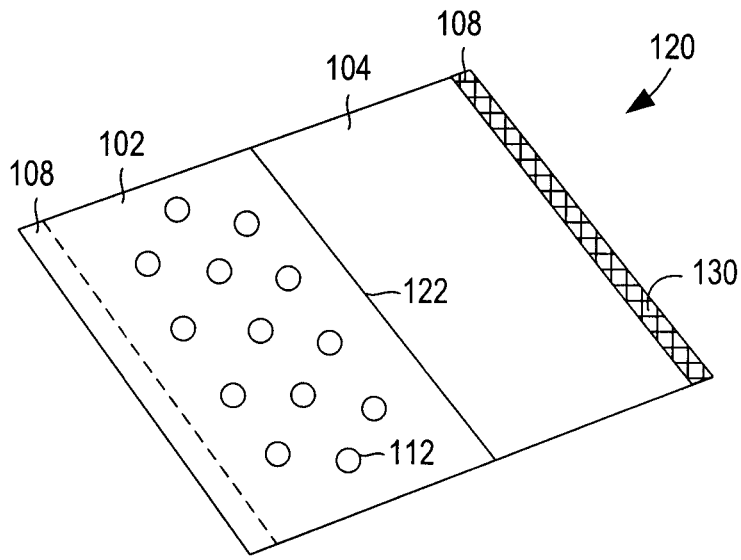
FIGS. 1G-1I schematically illustrate an exemplary method for forming the construct of FIGS. 1A-1C from the blank of FIGS. 1D-1F.
Figure 1H:
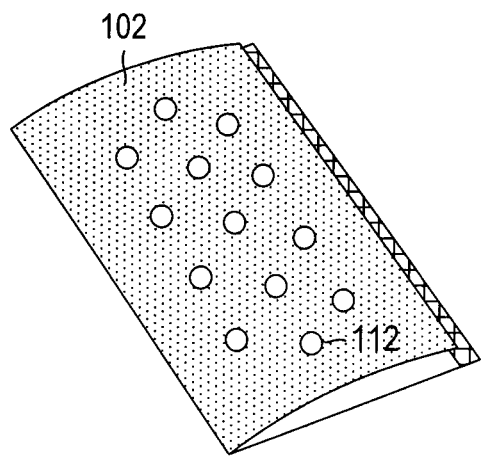
Figure 1I:
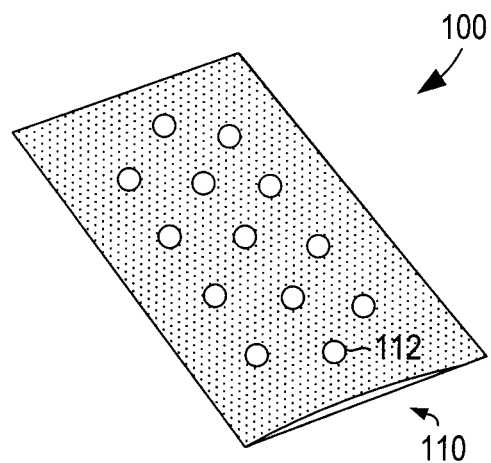

As show schematically in FIGS. 1G-1I, to form the blank 120 into the construct 100 according to one exemplary method an adhesive material 130 (shown schematically with cross-hatching) may be applied to the attachment area 108 (FIG. 1G) of one or both panels 102, 104, folding panel 102 towards panel 104 along line of disruption 122 (FIG. 1H), and bringing the peripheral edges of panels 102, 104 into alignment with one another (FIG. 1I) to join the panels 102, 104 to one another. However, numerous other methods of forming the construct 100 may be used.

FIGS. 2A-2I schematically depict an exemplary variation of the microwave heating apparatus or construct 100 of FIGS. 1A-1C and blank 120 of FIGS. 1D-1F for forming the apparatus of FIGS. 1A-1C. The apparatus 200 and blank 220 include features that are similar to the apparatus 100 and blank 120 shown in FIGS. 1A-1F, except for variations noted and variations that will be understood by those of skill in the art. An exemplary method of forming the construct 200 from the blank 220 is illustrated schematically in FIGS. 2G-2I. For simplicity, the reference numerals of similar features are preceded in the figures with a "2" instead of a "1".

In this example, the construct 200 has a generally square shape with rounded corners suitable for receiving a somewhat square and/or rounded food item or a plurality of smaller food items thereon, for example, a pizza, an open faced sandwich, a filled pastry product, a breaded meat product, a calzone, a Stromboli, or any other suitable food item. However, numerous other shapes are contemplated.

Further, in this example, the apertures 212 comprise a plurality of elongate cutouts or slots extending in a direction oblique to the first direction D1 and the second direction D2. More particularly, the apertures 212 are aligned in a direction substantially parallel to a first diagonal centerline CD1 and in a direction substantially perpendicular to a second diagonal centerline CD2. In this example, the apertures are arranged in two groups on opposite sides of the second diagonal centerline CD2. However, any suitable shape, size, orientation, and arrangement of apertures may be used for a particular heating application. For example, in some embodiments, the apertures may have rounded corners. Numerous other possibilities are contemplated.

Figure 2A:
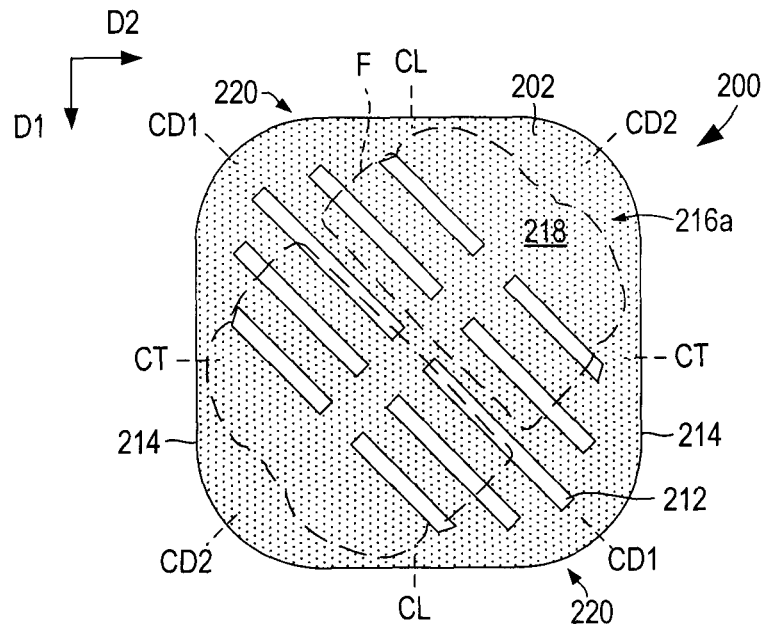
FIG. 2A is a schematic top plan view of an exemplary construct for heating, browning, and/or crisping a food item in a microwave oven.
Figure 2B:
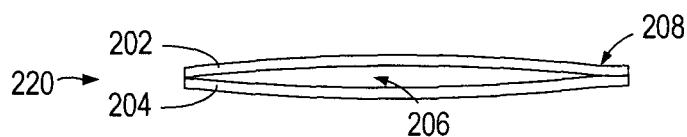
FIG. 2B is a schematic end elevation view of the construct of FIG. 2A.
Figure 2C:
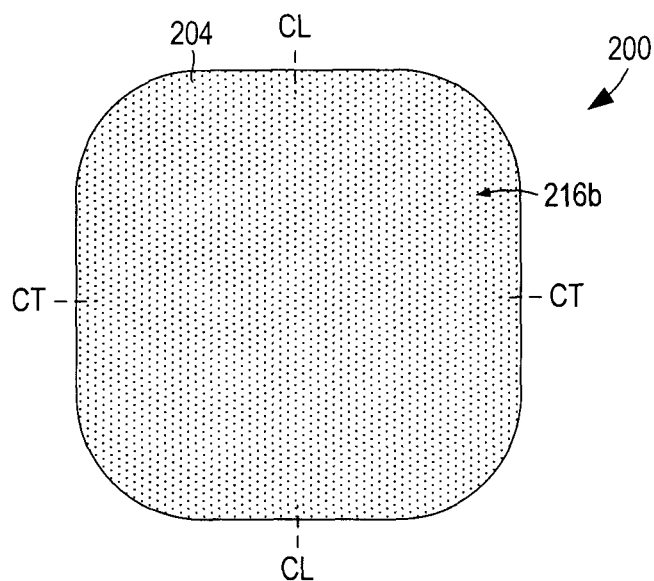
FIG. 2C is a schematic bottom plan view of the construct of FIG. 2A.
Figure 2D:
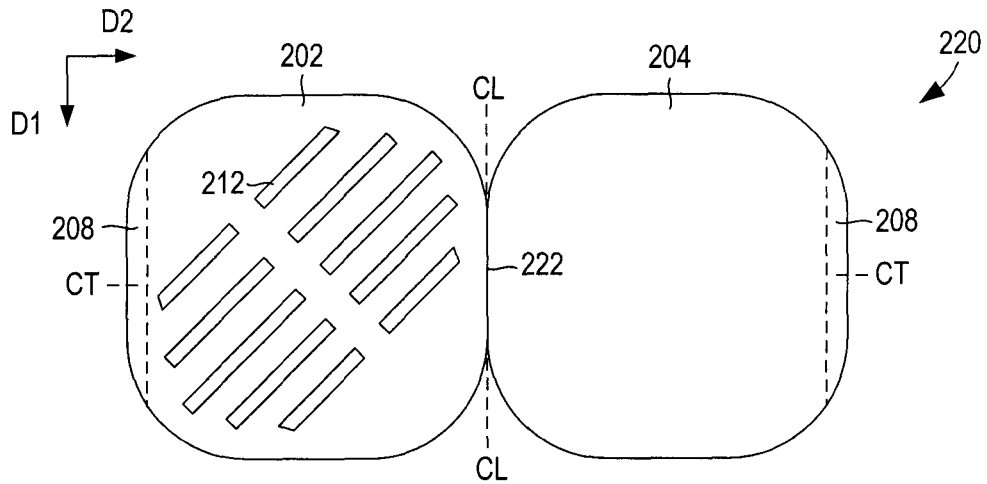
FIGS. 2D and 2E are schematic top and bottom plan views of an exemplary blank for forming the construct of FIGS. 2A-2C.
Figure 2E:
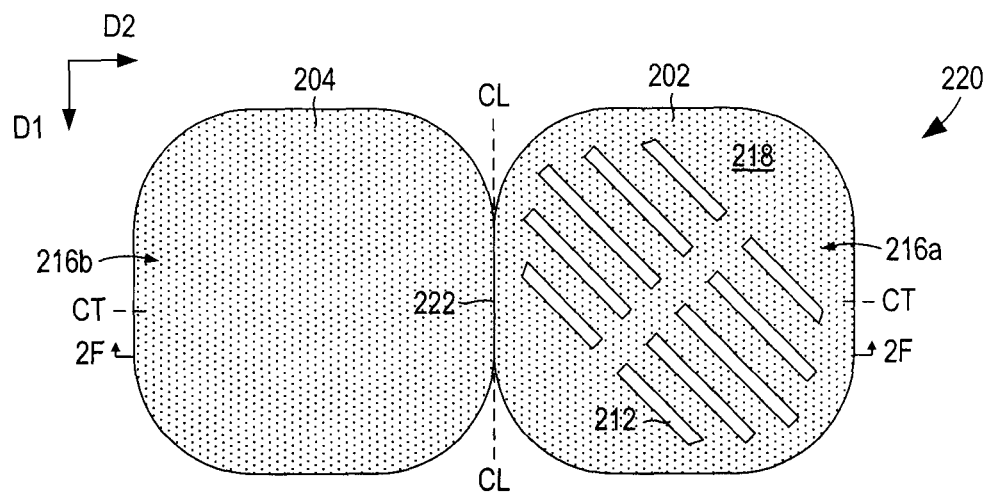
Figure 2F:
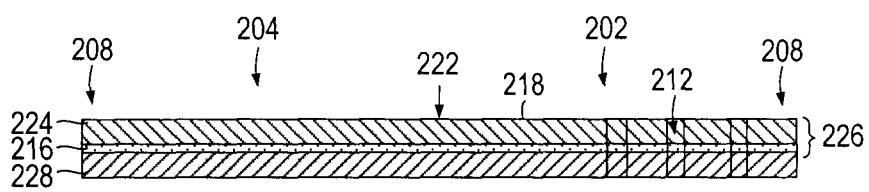
FIG. 2F is a schematic cross-sectional view of the blank of FIG. 2E taken along a line 2F-2F.
Figure 2G:
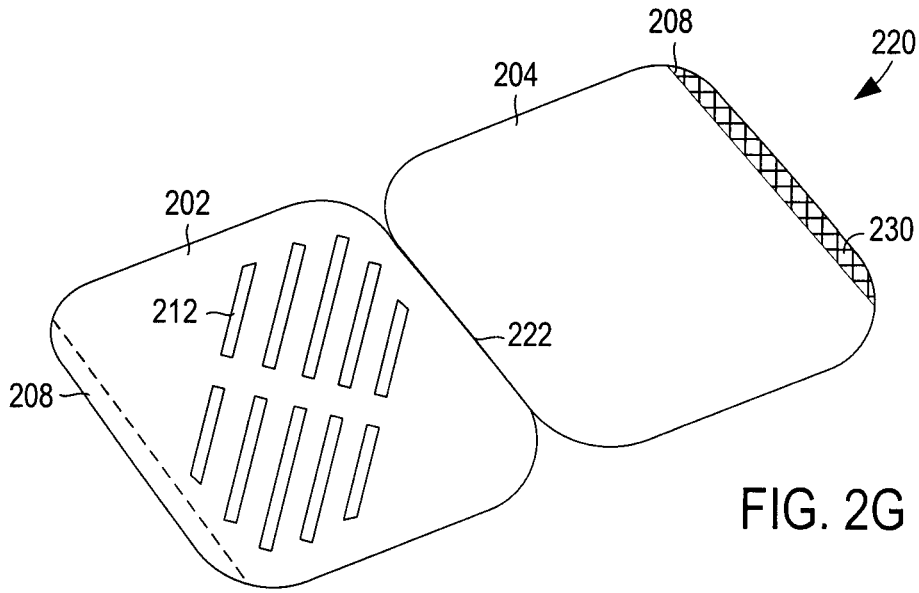
FIGS. 2G-2I schematically illustrate an exemplary method for forming the construct of FIGS. 2A-2C from the blank of FIGS. 2D-2F.
Figure 2H:
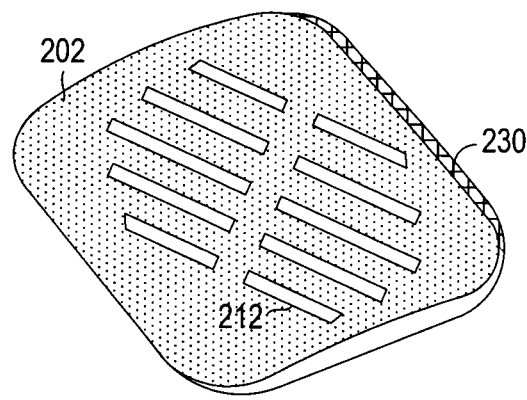
Figure 2I:
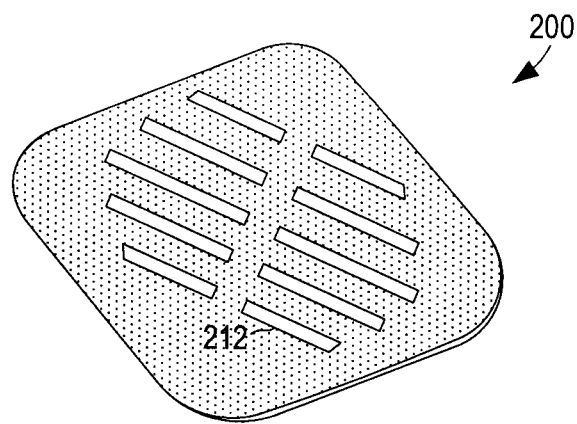

The construct 200 may be formed in the manner described in connection with FIGS. 1G-1I, as shown schematically in FIGS. 2G-2I.

Upon sufficient exposure to microwave energy, the susceptors 216a, 216b convert at least a portion of the impinging microwave energy into thermal energy, which then may brown and/or crisp the surface of the food item. Less heat may be generated in the areas including the apertures 212, since only susceptor 216b is present, while more heat may be generated in the remaining areas where both susceptors 216a, 216b are present. As a result, the food item may be browned and/or crisped somewhat less in the areas adjacent to the apertures 212. The overall pattern of browning and/or crisping may resemble grill marks, such that the lighter and darker areas resemble the markings that may be obtained by heating a food item on a grill. Browning and/or crisping may be facilitated further by the transport of moisture away from the food item F via apertures 212, the unjoined area or gap 206 between the panels 202, 204, and the open end(s) 210 of the construct 200.

In one particular example, the food item F may be a sandwich that has been separated into two sections, each including a piece of bread and one or more toppings in an "open face" configuration. After heating, the components of the sandwich may be stacked on top of one another in a facing relationship to form a double faced sandwich. In another example, both the bread and the "filling" of a sandwich may be desirably browned and/or crisped. The filling, for example, a breaded meat item, may be placed on one part of the construct, while the bread may be placed on the other, for example. If desired, the user may be instructed to invert or "flip" one or both items during heating to brown and/or crisp the opposite side of the respective item. Additionally or alternatively, where the sandwich includes two pieces of bread (i.e., where the sandwich is a double faced sandwich), the user may be instructed to replace the browned and/or crisped bread with the other piece, so that both pieces may be browned and/or crisped. Countless other possibilities are contemplated.

Numerous other microwave heating constructs are encompassed by the disclosure. Any of such constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors (e.g., susceptors or susceptor layers 116a, 116b, 216a, 216b) and other microwave energy interactive elements, and microwave energy transparent or inactive materials, for example, those used to form the remainder of the construct.

The microwave energy interactive material may be an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

While susceptors are described in detail herein, it will be appreciated that the construct may include other microwave energy interactive elements. By way of example, the construct may include a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Marietta, Ga.) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

In still another example, the construct may include a microwave energy interactive insulating material. Examples of such materials are provided in U.S. Pat. No. 7,019,271, U.S. Pat. No. 7,351,942, and U.S. Patent Application Publication No. 2008/0078759 A1, published Apr. 3, 2008, each of which is incorporated by reference herein in its entirety.

As discussed above, any of the numerous microwave energy interactive elements (e.g., susceptors, foils, etc.) described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas must be balanced to attain the desired overall heating characteristics for the particular food item.

In some embodiments, one or more portions of the susceptor may be designed to be microwave energy inactive to ensure that the microwave energy is focused efficiently on the areas to be heated, browned, and/or crisped, rather than being lost to portions of the food item not intended to be browned and/or crisped or to the heating environment.

In other embodiments, it may be beneficial to create one or more discontinuities or inactive regions to prevent overheating or charring of the food item and/or the construct including the susceptor. By way of example, the susceptor may incorporate one or more "fuse" elements that limit the propagation of cracks in the susceptor structure, and thereby control overheating, in areas of the susceptor structure where heat transfer to the food is low and the susceptor might tend to become too hot. The size and shape of the fuses may be varied as needed. Examples of susceptors including such fuses are provided, for example, in U.S. Pat. Nos. 5,412,187, 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

In the case of a susceptor, any of such discontinuities or apertures may comprise a physical aperture or void (e.g., apertures 112, 212) in one or more layers or materials used to form the structure or construct, or may be a non-physical "aperture" (not shown). A non-physical aperture is a microwave energy transparent area that allows microwave energy to pass through the structure without an actual void or hole cut through the structure. Such areas may be formed by simply not applying microwave energy interactive material to the particular area, by removing microwave energy interactive material from the particular area, or by mechanically deactivating the particular area (rendering the area electrically discontinuous). Alternatively, the areas may be formed by chemically deactivating the microwave energy interactive material in the particular area, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors or liquids released from the food item to be carried away from the food item.

As stated above, the microwave energy interactive element may be supported on a microwave inactive or transparent substrate 124, 224 (FIGS. 1F and 2F), for example, a polymer film or other suitable polymeric material, for ease of handling and/or to prevent contact between the microwave energy interactive material and the food item. The outermost surface of the polymer film may define at least a portion of the food-contacting surface of the package (e.g., surface 118, 218 of respective polymer film 124, 224). Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other nonconducting substrate materials such as paper and paper laminates, metal oxides, silicates, cellulosics, or any combination thereof, also may be used.

If desired, the polymer film may undergo one or more treatments to modify the surface prior to depositing the microwave energy interactive material onto the polymer film. By way of example, and not limitation, the polymer film may undergo a plasma treatment to modify the roughness of the surface of the polymer film. While not wishing to be bound by theory, it is believed that such surface treatments may provide a more uniform surface for receiving the microwave energy interactive material, which in turn, may increase the heat flux and maximum temperature of the resulting susceptor structure. Such treatments are discussed in U.S. patent application Ser. No. 12/709,578, filed Feb. 22, 2010, which is incorporated by reference herein in its entirety.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Various materials may serve as the base material 128, 228 (FIGS. 1F and 2F) for the construct 100, 200. For example, the construct may be formed at least partially from a polymer or polymeric material. As another example, all or a portion the construct may be formed from a paper or paperboard material. The paper may have a basis weight of from about 15 to about 60 lbs/ream (lb/3000 sq. ft.), for example, from about 20 to about 40 lbs/ream. In another example, the paper may have a basis weight of about 25 lbs/ream. The paperboard may have a basis weight of from about 60 to about 330 lbs/ream, for example, from about 155 to about 265 lbs/ream. In one particular example, the paperboard may have a basis weight of about 175 lbs/ream. The paperboard generally may have a thickness of from about 6 to about 30 mils, for example, from about 14 to about 24 mils. In one particular example, the paperboard may have a thickness of about 16 mils. Any suitable paperboard may be used, for example, a solid bleached or solid unbleached sulfate board, such as SUS® board, commercially available from Graphic Packaging International.

The construct may be formed according to numerous processes known to those in the art, including using adhesive bonding, thermal bonding, ultrasonic bonding, mechanical stitching, or any other suitable process. Any of the various components used to form the construct may be provided as a sheet of material, a roll of material, or a die cut material in the shape of the package to be formed (e.g., a blank).

The disclosure may be understood further from the following examples, which are not intended to be limiting in any manner.

EXAMPLE 1

The heating, browning, and/or crisping of a commercially available frozen Stromboli product was compared using various apparatuses. A first apparatus was similar the apparatus of FIGS. 1A-1C. A second apparatus was similar to the first apparatus, except that the first panel and the second panel were joined substantially continuously to one another, such that there was little or no gap between the panels.

Each Stromboli was heated on the respective apparatus for about 3 minutes in an 1100 W Panasonic microwave oven that included a turntable. After heating, the bottom of each Stromboli was examined. The Stromboli heated on the first apparatus was heated, browned, and crisped suitably, while the Stromboli heated on the second apparatus was not browned or crisped to the desired level.

EXAMPLE 2

The heating, browning, and/or crisping of a commercially available frozen Panini product was compared using various apparatuses. A first apparatus was similar the apparatus of FIGS. 2A-2C. A second apparatus was a microwave heating tray seated on a carton. A third apparatus was similar to the first apparatus, except that the first panel and the second panel were joined substantially continuously to one another, such that there was little or no gap between the panels. The third apparatus also was substantially octagonal in shape.

Each Panini was heated on the respective apparatus for about 3 minutes in an 1100 W Panasonic microwave oven that included a turntable. The Panini heated on the first apparatus was heated, browned, and crisped suitably, while the Paninis heated on the second and third apparatuses were not browned or crisped to the desired level.

EXAMPLE 3

The heating, browning, and/or crisping of a commercially available frozen flatbread pizza product was compared using various apparatuses. A first apparatus was similar the apparatus of FIGS. 1A-1C, except the arrangement of apertures differed from the apparatus of FIGS. 1A-1C. Further, the apertures were formed manually by punching a die or other suitable implement into the food-contacting panel, thereby partially striking flap-like tabs from the panel. (Such tabs or protrusions may have extended somewhat into the gap, such that the tabs or protrusions may have assisted with maintaining a space between the panels.) A second apparatus was a single layer susceptor tray with side walls including apertures.

Each flatbread pizza was heated on the respective apparatus for about 2 minutes in an 1100 W Panasonic microwave oven that included a turntable. After heating, the bottom of each flatbread pizza was examined. The flatbread pizza heated on the first apparatus was heated, browned, and crisped suitably, while the flatbread pizza heated on the second apparatus was not browned or crisped to the desired level.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A method of heating, browning, and/or crisping a food item in a microwave oven, comprising:

placing a food item on a microwave heating construct, the food item having a surface that is desirably at least one of browned and crisped, wherein the microwave heating construct comprises a first panel and a second panel in a facing, contacting relationship with one another, the first panel and the second panel each having an interior side and an exterior side, wherein the first panel and the second panel are joined to one another along respective opposite side edges such that an unjoined area is defined between the interior sides of the first panel and the second panel, the unjoined area being in communication with an open peripheral edge of the construct, wherein the first panel and the second panel each comprise a microwave energy interactive material operative for converting at least a portion of impinging microwave energy into thermal energy, and the first panel includes an aperture in communication with the unjoined area between the first panel and the second panel, wherein placing the food item on the microwave heating construct comprises placing the food item on the exterior side of the first panel so that the surface of the food item is proximate to the microwave energy interactive material of the first panel, and so that the food item overlies the aperture so that the surface of the food item is in communication with the unjoined area between the first panel and the second panel; and exposing the food item positioned on the exterior side of the first panel of the microwave heating construct to microwave energy within the microwave oven, so that during the exposing the microwave energy interactive material converts at least a portion of the microwave energy into heat, the heat is transferred to the food item to brown and/or crisp the surface of the food item, and the surface of the food item is in communication, by way of the aperture, with the unjoined area between the first panel and the second panel.

2. The method of claim 1, wherein the second panel includes an aperture in communication with the unjoined area between the first panel and the second panel.

3. The method of claim 1, wherein the aperture is substantially circular in shape.

4. The method of claim 1, wherein the aperture is substantially elongate in shape.

5. The method of claim 1, wherein the aperture extends in a direction oblique to the opposite side edges.

6. The method of claim 1, wherein the microwave energy interactive material has an optical density of from about 0.17 to about 0.28.

7. The method of claim 1, wherein the open peripheral edge of the construct comprises a open end of a pair of opposite open ends of the construct.

8. The method of claim 1, wherein at least a portion of the first panel is spaced from the second panel.

9. The method of claim 1, wherein placing the food item on the exterior side of the first panel moves a first portion of the first panel into contact with the second panel, while a second portion of the first panel remains spaced from the second panel.

10. The method of claim 1, wherein during the exposing:
moisture is released from the food item, and
at least a portion of the moisture is carried away from the food item, through the aperture.

11. The method of claim 1, wherein during the exposing:
moisture is released from the food item, and
at least a portion of the moisture is carried away from the food item through the aperture and the unjoined area between the first panel and the second panel of the construct.

* * * * *